May 26, 1931. H. B. KIMBRELL 1,807,537
RAT TRAP
Filed June 25, 1929
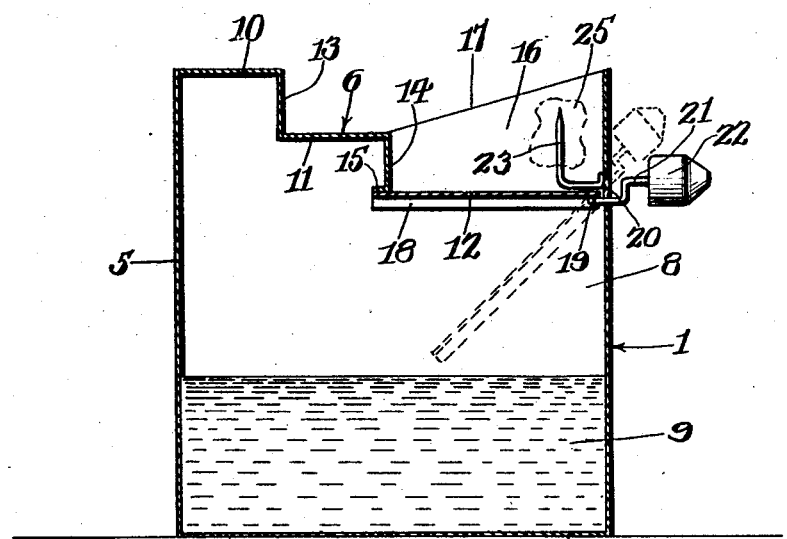
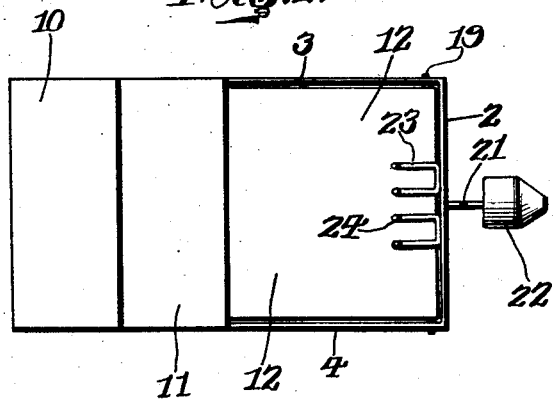
INVENTOR.
H.B.Kimbrell,
BY
Geo. F. Kimmel
ATTORNEY.

Patented May 26, 1931

1,807,537

UNITED STATES PATENT OFFICE

HOLLIE B. KIMBRELL, OF FAYETTE, ALABAMA

RAT TRAP

Application filed June 25, 1929. Serial No. 373,649.

This invention relates to a rat trap, and has for its object to provide, in a manner as hereinafter set forth, a trap of the class referred to including a casing having a stepped top and with the lowermost part of the top in the form of a pivoted, counterbalanced closure for the casing and further constituting a support for a bait hook whereby the bait is so positioned that the rodent cannot reach the same from the front, sides and rear of the casing, but is compelled to attack the bait at the lowermost portion of the top of the casing resulting in the weight of the rodent shifting said lowermost part of the top downwardly, whereby the animal will fall into and be trapped by the casing.

Further objects of the invention are to provide, in a manner as hereinafter set forth, a rat trap which is simple in its construction and arrangement, strong, durable, thoroughly efficient in its use, readily assembled and comparatively inexpensive to manufacture.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claim hereunto appended.

In the drawings wherein like reference characters denote corresponding parts throughout the several views:

Figure 1 is a vertical sectional view of a rat trap in accordance with this invention and further illustrating in dotted lines the counterbalanced closure in a lowered position.

Figure 2 is a top plan view of the trap.

A rat trap in accordance with this invention comprises a casing referred to generally at 1 and which includes a back wall 2, a pair of side walls 3, 4, a front wall 5 and a top wall referred to generally at 6. The casing preferably is of rectangular formation and its bottom is indicated at 7. The casing 1 provides a trapping chamber 8 and in which is contained a body of water 9 for the purpose of drowning the rodent when the latter is deposited or trapped into chamber 8.

The back wall 2 is of the same height as the front wall 5. The top wall 6 is of stepped form and comprises a series of longitudinally extending parts 10, 11 and 12 extending in parallel, spaced planes. The part 10 is arranged above the part 11 and the latter is arranged above the part 12. The length of parts 10 and 11 is materially less than the length of part 12. The top wall 6 further includes a pair of vertically disposed parts 13, 14 extending in parallel, spaced planes. The part 13 connects parts 10 and 11 together and the part 14 depends from the forward end of part 11 and at its bottom is provided with a forwardly directed, right angularly disposed flange 15.

The parts 10, 11, 13 and 14 are stationary. The part 12 is pivotally supported and constitutes a closure for an opening provided by the side walls 3, 4, back wall 2 and part 14 of the top wall 6. The part 12 is arranged below part 14 and also below the top edges of the walls 2, 3 and 4. The part 12 in connection with the part 14 of the top wall and the upper portions of the walls 2, 3 and 4 form what may be termed a bait containing compartment 16 which is open at its top and normally closed at its bottom by the part 12.

The parts 10, 11, 13 and 14 of the top 6 are secured to the front wall 5 and side walls 3, 4. The portions of the side walls 3, 4 rearwardly of the part 14 have the top edges thereof inclining from part 14 to the top of the back wall 2, as indicated at 17.

The part 12 is of a length to extend from flange 15 to a point slightly removed from the back wall 2 and is of a width to extend to a point in close proximity to the side walls 3, 4. The sides of the part 12 are formed with depending flanges 18 which are co-extensive with the length of part 12.

Mounted in the side walls 3, 4 in proximity to the back wall 2 and extending transversely of the chamber 8 is a pivot rod 19 which extends through and is fixed to the rear ends of the flanges 18. The back wall 2, centrally thereof is formed with a verically disposed slot 20 which opposes the rear end of part 12. Fixed to the rod 19 and extending through the slot 20 is an angle-shaped crank arm 21 carrying on its outer end a counterbalanced weight 22. The function of the weight 22 is to normally retain the part 12 in abutting engagement with the flange 15 for the purpose of closing the bottom of the bait compartment 16.

Fixedly secured to the inner face of the back wall 2 are spaced bait holders or hooks 23, 24 and they are arranged at opposite sides of and in close proximity to the slot 20. The bases of the hooks or holders are positioned in close proximity to the part 12 when the latter abuts against the flange 15.

When the rodent travels upon the top 6 of the casing 1 and attempts to attack the bait 25 it will pass upon the part 12 and the weight of the rodent will rock part 12 to the dotted line position shown in Figure 1 and the animal will then be precipitated into the chamber 8 and drowned by the water 9. The level of the body of water 9 is such as to completely submerge the rodent when it is precipitated into the chamber 8. After the rodent has passed off the part 12, the weight 22 acts to restore the part 12 to the full line position shown in Figure 1.

It is thought the many advantages of a rat trap, in accordance with this invention can be readily understood, and although the preferred embodiment of the invention is as illustrated and described, yet it is to be understood that changes in the details of construction can be had which fall within the scope of the invention as claimed.

What I claim is:

A rat trap comprising a casing providing a trapping chamber and including a bottom, a pair of side walls, a front wall, a back wall and a top, said top formed with an angle shaped stationary forward part and a flat shiftable rear part, the rear of said stationary part depending below the top of said side walls, said shiftable part positioned below the tops of said sides and back wall and normally abutting the lower terminus of the rear of said stationary part, said parts in connection with the portions of said sides and back wall forming an open top bait compartment in the upper part of the rear of the casing, said compartment gradually increasing in height from its front to its back, said stationary part providing steps leading downwardly to the front of said compartment, said back wall being slotted, a counter-balanced pivoting means fixedly secured to the rear end of said shiftable part, journaled in said side wall and extending through said slot and projecting rearwardly from the back wall, and a bait holder positioned over the rear of said shiftable part and secured to said back wall.

In testimony whereof, I affix my signature hereto.

HOLLIE B. KIMBRELL.